July 25, 1950     F. E. LUSTENBERGER ET AL     2,516,709

REAMER ADAPTER

Filed July 13, 1949

INVENTORS.
FREDERICK E. LUSTENBERGER
GERALD CARDINAL.
BY
Edward Gottlieb
ATTORNEY Patented July 25, 1950

2,516,709

UNITED STATES PATENT OFFICE 2,516,709

REAMER ADAPTER

Frederick E. Lustenberger, New York, and Gerald Cardinal, Brooklyn, N. Y.

Application July 13, 1949, Serial No. 104,568

1 Claim. (Cl. 279—83)

This invention relates to new and useful improvements in reamer adapters, and has more particular reference to a new adapter which will facilitate reaming straight holes.

Heretofore, it has been customary to use a bushing for mounting a reamer in a machine tool. The use of bushings has many drawbacks, most important of which is that a different size bushing is required for each different size reamer.

This invention particularly proposes the construction of a reamer adapter which is capable of receiving various sizes of reamers up to a maximum size, limited merely by the opening in the adapter.

A further object of this invention resides in providing the reamer adapter with a center which is coaxial either with the outside diameter of the adapter when the adapter is used in a floating holder of a turret lathe, or which is concentric with a spindle when the adapter is used upon an engine lathe. The invention also proposes providing the adapter with a plurality of set screws about its periphery spaced from said center and engageable against the sides of the reamer for properly centering the reamer to the hole which is to be reamed, and also for keeping the reamer from spinning in the adapter.

Another object of the invention is the construction of a reamer adapter as described, which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of the disclosure:

Figure 1:
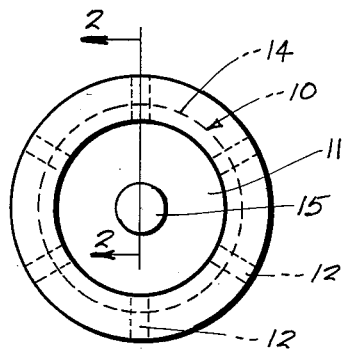
Fig. 1 is an end view of a reamer adapter constructed in accordance with this invention.
Figure 2:
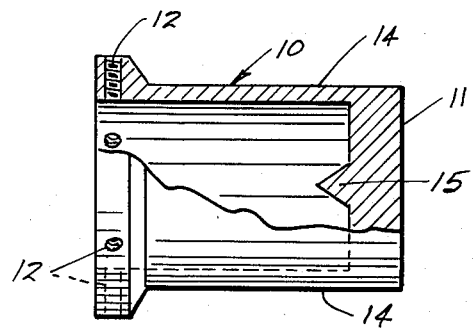
Fig. 2 is a side view of Fig. 1 with a portion shown in section as though taken on the line 2—2 of Fig. 1.

The reamer adapter disclosed in Figs. 1 and 2, includes a hollow cylindrical body 10 having a back end wall 11 closing the back end thereof. The inside diameter of the hollow cylindrical body 10 is large enough to selectively receive a number of different size reamers. A plurality of set screws 12 are threadedly mounted radially about the front end portion of said body 10. The set screws 12 may be used for centering the reamer in the cylindrical body 10 and for tightly holding it against spinning.

Means is associated with the body 10 by which it may be coaxially mounted of the spindle of a machine tool. This means comprises merely an outside diameter 14 for engaging in the usual floating holder of a turret lathe. A center 15 for engaging the inner end of a reamer is located on the inner face of the back end wall 11 at a substantial distance from said set screws 12. This center 15 is illustrated as being of the male type, though it could be female, or an adapter plug may be engaged in the reamer adapter as will be more specifically described in the next form of this invention.

Figure 3:
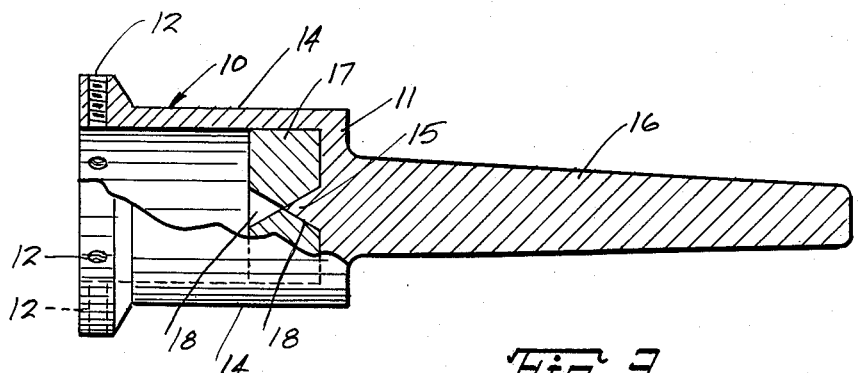
Fig. 3 is a fragmentary sectional view similar to Fig. 2 but disclosing another form of the new reamer adapter.

In Fig. 3 another form of the invention has been disclosed in which the reamer adapter is particularly designed for an engine lathe. It distinguishes from the prior form in the provision of a spindle 16 on the back end wall 11 coaxially of the center 15. In other respects this form of the invention is identical to the prior form and like parts have been identified by like reference numerals.

An adapter plug 17 is illustrated engaged in the hollow cylindrical body 10. This adapter plug 17 is provided with female centers 18, one of which is engaged over the center 15 and the other of which is capable of receiving the male center of a reamer.

The operation of the reamer adapter may be understood from the following:

After a hole has been drilled and bored in work the reamer is set into the adapter, inserting the female center of the latter on the main center of the adapter. The adapter is mounted in the machine tool. If the machine tool is a turret lathe the adapter is mounted in the usual floating holder thereof. If an engine lathe, the spindle 16 is utilized for mounting the adapter in position. In the event that the reamer has a male center, the plug 17 is inserted into the adapter so that its female center 18 may receive the male center of the reamer.

The reamer is then set against the hole to be reamed and the set screws 12 are tightened down on the shank of the reamer to center the reamer to the hole and also to keep the reamer from spinning in the adapter. With this procedure it is almost impossible not to get the reamer on true center because of the fact that the outside diameter 14 of the adapter, or the spindle 16 of the second adapter, is concentric with the centers 15, or 18. This construction eliminates guess work on the part of the set-up man or operator of the machine in determining what is causing the trouble he may be having in obtaining a straight hole when using the old bushings. The new adapter therefore decreases the time required for setting up a job. Another advantage of the new adapter is that it may take a reamer up to the size of the inside diameter of the body 10. With the new adapter straight holes may easily be reamed with tolerances as close as plus nothing minus two ten thousandths (+.0000—.0002) or vice versa.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

A reamer adapter, comprising a hollow cylindrical body having a back end wall closing the back end thereof and an inside diameter large enough to selectively receive a number of different size reamers, a plurality of set screws threadedly mounted radially about the front end portion of said body for centering and tightly holding a reamer disposed axially in said body, means for centering said body coaxially of the spindle of a machine tool, and a center for the inner end of said reamer located on the inner face of said back end wall at a substantial distance from said set screws.

FREDERICK E. LUSTENBERGER.
GERALD CARDINAL.

REFERENCES CITED

The following references are of record in the file of this patent:

UNITED STATES PATENTS

| Number | Name | Date |
|---|---|---|
| 137,298 | Ferrin | Apr. 1, 1873 |
| 366,908 | Winsor | July 19, 1887 |

FOREIGN PATENTS

| Number | Country | Date |
|---|---|---|
| 502,669 | France | May 22, 1920 |

OTHER REFERENCES

James (American Machinist), published by McGraw-Hill Co., New York, N. Y. (page 163—copy in Div. 52).

Waychoff (American Machinist), published by McGraw-Hill Co., New York, N. Y. (page 88—copy in Div. 52).